United States Patent [19]

Hartmann

[11] Patent Number: 4,706,982
[45] Date of Patent: Nov. 17, 1987

[54] DUAL RANGE PLANETARY TRANSMISSION FOR PEDAL POWERED VEHICLES

[76] Inventor: Dirck T. Hartmann, 4121 Morningstar Dr., Huntington Beach, Calif. 92649

[21] Appl. No.: 854,004

[22] Filed: Apr. 21, 1986

[51] Int. Cl.[4] ............................................. B62M 1/08
[52] U.S. Cl. ................................ 280/238; 74/750 B; 74/760; 74/781 B; 280/260
[58] Field of Search ............... 280/260, 236, 238, 259; 74/750 B, 750 R, 781 B, 660, 674, 393, 394, 760, 766, 768, 785, 594.2

[56] References Cited

U.S. PATENT DOCUMENTS

| | | | |
|---|---|---|---|
| 619,118 | 2/1899 | Barnes | 280/260 |
| 707,359 | 8/1902 | Scharbach | 74/347 |
| 1,184,321 | 5/1916 | Chapin | 280/270 |
| 1,506,565 | 8/1924 | Clatworthy | 280/7.15 |
| 1,798,384 | 3/1931 | Roberds | 280/260 |
| 2,505,464 | 4/1950 | Debuit | 280/260 |
| 3,372,608 | 3/1968 | Gleasman | 280/238 |
| 3,727,484 | 4/1973 | Shea | 74/750 B |
| 3,863,503 | 2/1975 | Loeb et al. | 74/347 |
| 3,920,263 | 11/1975 | Bundschuh | 280/106 |
| 3,934,481 | 1/1976 | Foster | 74/190.5 |
| 4,447,068 | 5/1984 | Brooks | 280/260 |

FOREIGN PATENT DOCUMENTS

| | | | |
|---|---|---|---|
| 0029359 | 11/1980 | European Pat. Off. | |
| 0158466 | 3/1985 | European Pat. Off. | |
| 1944934 | 3/1971 | Fed. Rep. of Germany | 280/238 |
| 2610644 | 3/1976 | Fed. Rep. of Germany | |
| 457860 | 6/1950 | Italy | 74/750 B |
| 9350 | of 1899 | United Kingdom | 280/238 |
| 738338 | 10/1955 | United Kingdom | 74/750 B |

Primary Examiner—John J. Love
Assistant Examiner—Everett G. Diederiks, Jr.

[57] ABSTRACT

A dual range planetary transmission which is located inside the hub of the driving wheel of a pedal powered vehicle such as a front wheel drive bicycle camper. The transmission includes a pedal drive shaft mounted in bearings on the axis of the wheel; a planet-gear-carrier driven by the pedal drive shaft with multiple sets of different size planet gears mounted on bearings in the carrier; a ring gear mounted on a bearing on the planet-gear-carrier, in constant mesh with all the multiple sets of planet gears, with provisions for selectively locking the ring gear against rotation; a sun-gear-carrier mounted on a bearing on the pedal drive shaft with provisions for selectively locking the sun-gear-carrier against rotation; multiple sun gears rotating freely on the sun-gear-carrier with each in constant mesh with one of the multiple sets of planet gears, with provisions for locking any selected one of the sun gears to the sun-gear-carrier; a conventional free-wheel ratchet mechanism driving the wheel hub from the ring gear; and a second conventional free-wheel ratchet mechanism driving the wheel hub from the sun-gear-carrier. When both the ring gear and the sun-gear-carrier are free to rotate, the transmission provides a direct drive. With four sun gears meshing with four sets of planet gears, the transmission provides four low range speeds when the sun gear is locked, and four high range speeds when the ring gear is locked.

7 Claims, 16 Drawing Figures

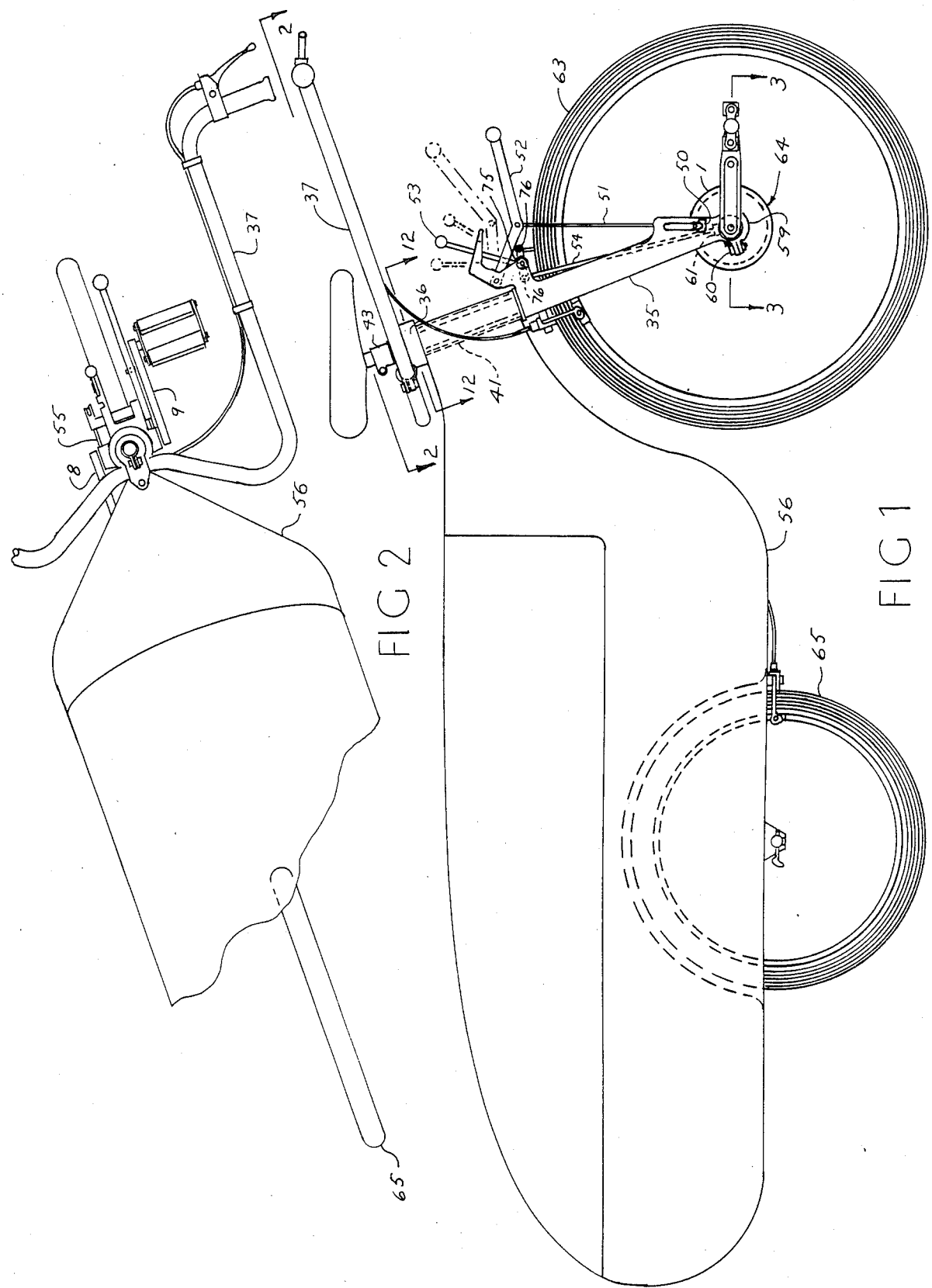

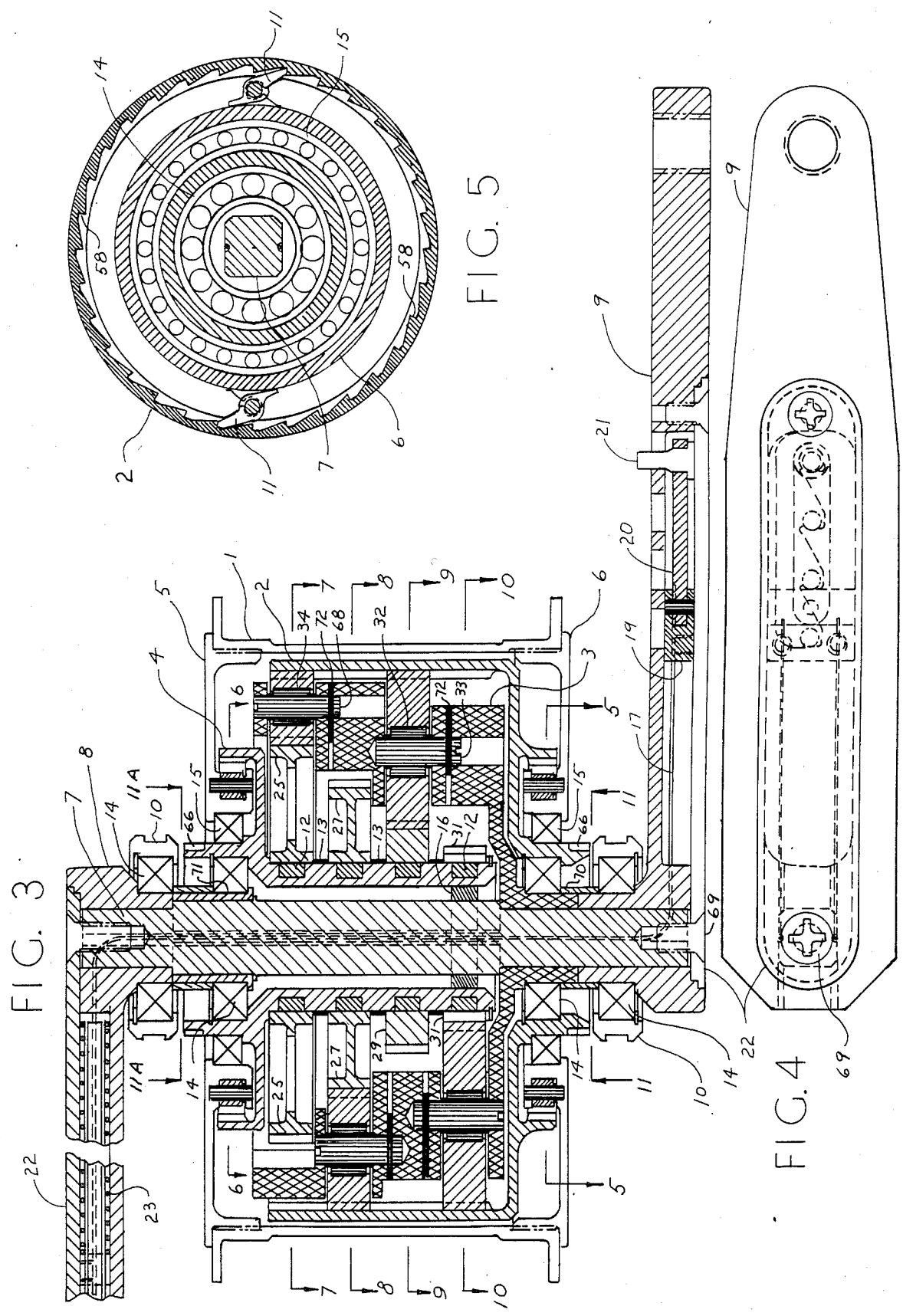

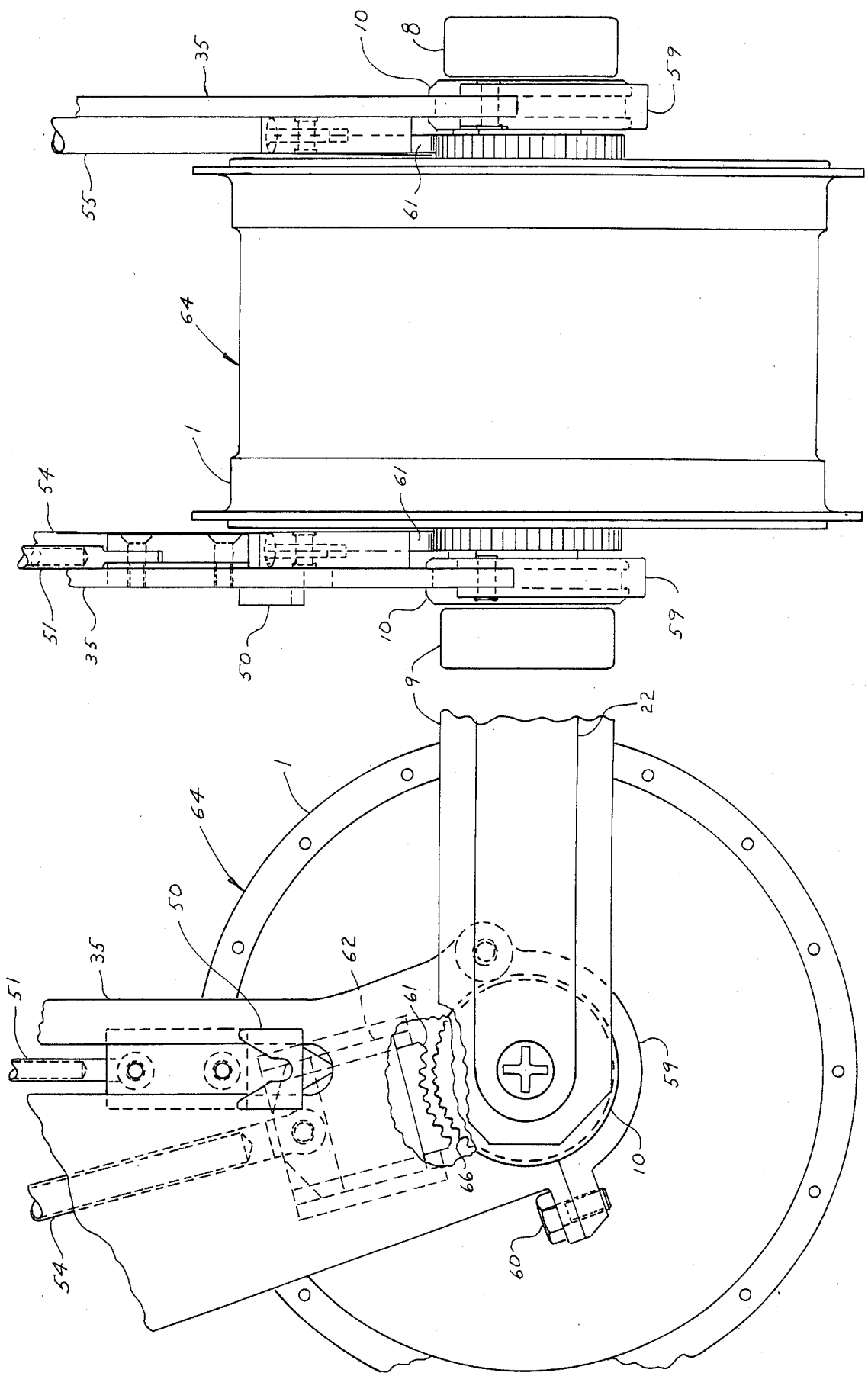

DUAL RANGE PLANETARY TRANSMISSION FOR PEDAL POWERED VEHICLES

BACKGROUND OF THE INVENTION

1. Field of the Invention

This invention relates generally to transmissions for pedal powered vehicles such as bicycles and tricycles and more particularly to bicycle drive mechanisms of the chainless planetary type.

2. Description of the Prior Art

The most common multiple speed bicycle uses a chain and derailleur system. The chain requires periodic cleaning and oiling for efficient operation and to prevent premature chain failure and must be removed from the rear sprocket to change the tire. Chain maintenance is particularly troublesome if the bicycle is ridden extensively on dirt roads and trails.

The transmission described in U.S. Pat. No. 2,505,464 by Debuit is a chainless type, located on the axis of the front wheel concentric with the pedal drive shaft, but Debuit's transmission is not planetary, and is mounted alongside the wheel hub. Moreover, the pedal torque is carried through single gear teeth, thus requring heavy gears to prevent early fatigue failure of the gear teeth.

SUMMARY OF THE INVENTION

An object of this invention is to provide a compact, durable, low maintenance transmission, a particular embodiment being adapted for use on a bicycle camper suitable for off-road operation, with gear ratios low enough to permit transporting the camper payload up steep grades, and high enough to permit conventional bicycle speeds on paved roads.

The multiple speed planetary transmission in accordance with the present invention includes a pedal drive shaft mounted in bearings on the axis of the wheel; a planet gear carrier driven by the pedal drive shaft; four sets of planet gears with three planet gears in each set rotatably mounted in bearings on the planet-gear-carrier; a ring gear, rotatably mounted on a bearing with provisions for selectively locking it against rotation, in constant mesh with all the sets of planet gears; a sun-gear-carrier rotatably mounted on a bearing with provisions for selectively locking it against rotation; four sun gears rotating freely on the sun-gear-carrier in constant mesh with the planet gears, with provisions for selectively locking any one of the sun gears to the sun-gear-carrier; and two conventional free-wheel ratchet mechanisms, one driving the wheel hub from the ring gear, and the other driving the wheel hub from the sun-gear-carrier. When both the ring gear and the sun-gear-carrier are free to rotate, the transmission is a direct drive. When the sun-gear-carrier is locked, the set of planet gears in mesh with the locked sun gear drives the ring gear at an increased rate of speed. When the ring gear is locked, the set of planet gears in mesh with the locked sun gear drives the sun-gear-carrier at a higher increased rate of speed. The transmission thus provides nine speeds, that is, a direct drive and four low range speeds with the sun gear locked, and four high range speeds with the ring gear locked.

The transmission of this invention is used in one embodiment in a bicycle camper with a molded shell of fiberglas/epoxy or similar composite, replacing the conventional bicycle frame. The vehicle is front wheel drive with the rider's seat on the axis of and rotating with the front fork. Steering torque is applied to the front fork through handlebars and a planetary gear steering arrangement located under the front seat. The molded shell features a wheel well for the rear wheel, a large interior volume for a load of camping equipment and supplies sufficient for extended camping trips. It unfolds to form a sheltered sleeping compartment.

Since the transmission is installed inside the wheel hub, with shielded bearings, it is well protected from dirt. It is well suited for vehicles intended for off-road service such as the bicycle camper.

Other aspects and advantages of the present invention will become apparent from the following more detailed description taken in conjunction with the accompanying drawings.

BRIEF DESCRIPTION OF THE DRAWINGS

FIG. 1 is a side elevational view of a bicycle camper with a nine-speed transmission according to the present invention located in the front wheel;

FIG. 2 is a view taken along the line 2—2 of FIG. 1.;

FIG. 3 is a view of the transmission taken along the line 3—3 of FIG. 1 with the transmission shown separated from the vehicle frame for clarity;

FIG. 4 is a side elevational view of the right side pedal crank arm;

FIG. 5 depicts the cross sectional view which would result in taking a view along line 5—5 of FIG. 3;

FIG. 14 is an enlarged elevational view of the right side of the vehicle showing the interface of the front fork with the transmission; and FIG. 15 is a front elevational view of the transmission located in the front fork.

DESCRIPTION OF THE PREFERRED EMBODIMENT

Figure 8:
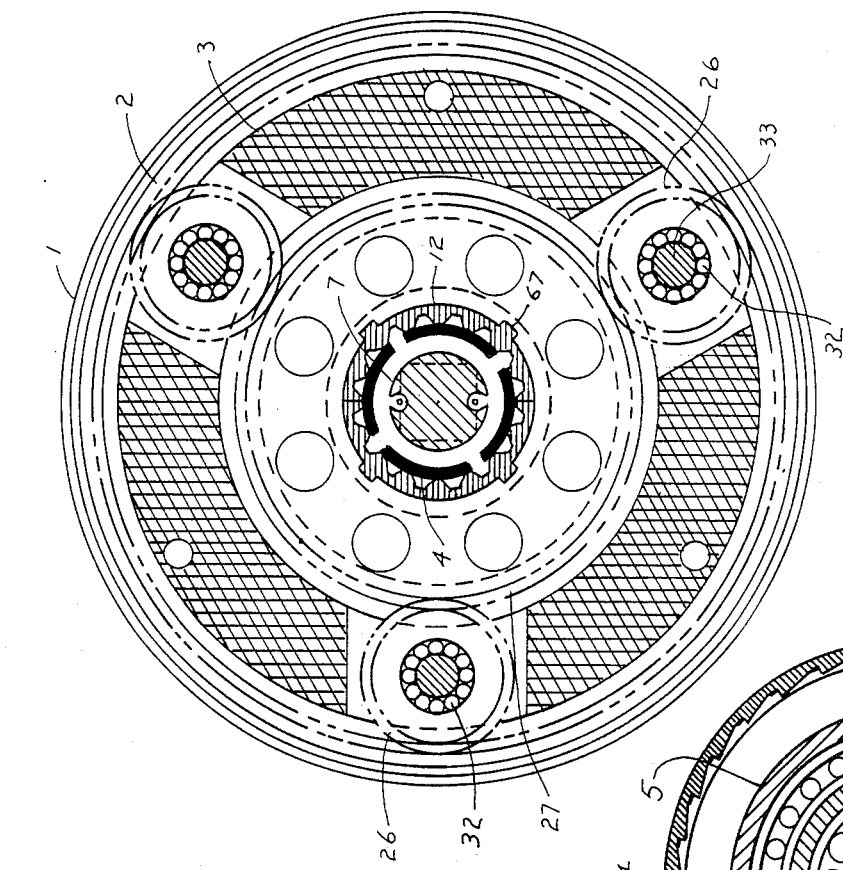
FIG. 8 is a cross sectional view taken along the line 8—8 of FIG. 3.
Figure 6:
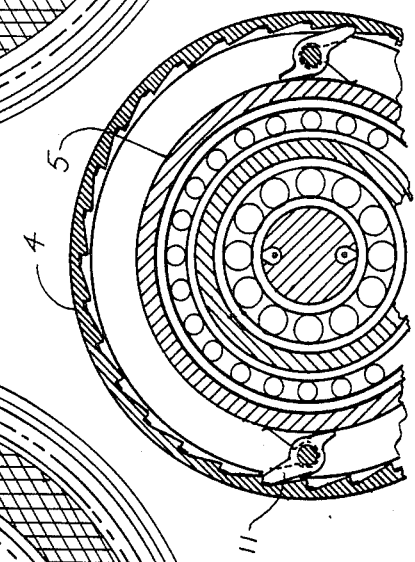
FIG. 6 depicts the cross sectional view taken along line 6—6 of FIG. 3.

Referring to FIG. 3, the nine-speed planetary transmission in accordance with the present invention includes a wheel hub 1, a ring gear 2, a planet-gear-carrier 3, a sun-gear-carrier 4, a left side hub driving plate 5, a right side hub driving plate 6, a pedal drive shaft 7, a left side pedal crank arm 8, a right side pedal crank arm 9, and front fork interface fittings 10.

As best seen in FIG. 5, torque is transferred from machined cogs 58, provided in both the ring gear 2 and the sun-gear-carrier fitting 4, to the wheel hub driving plates 5 and 6, by spring loaded dogs 11.

The driving plate 5 on the left side is threaded into the wheel hub 1 with left hand threads, and the driving plate 6 on the right side with right hand threads so that the driving torque is tightening.

Figure 7:
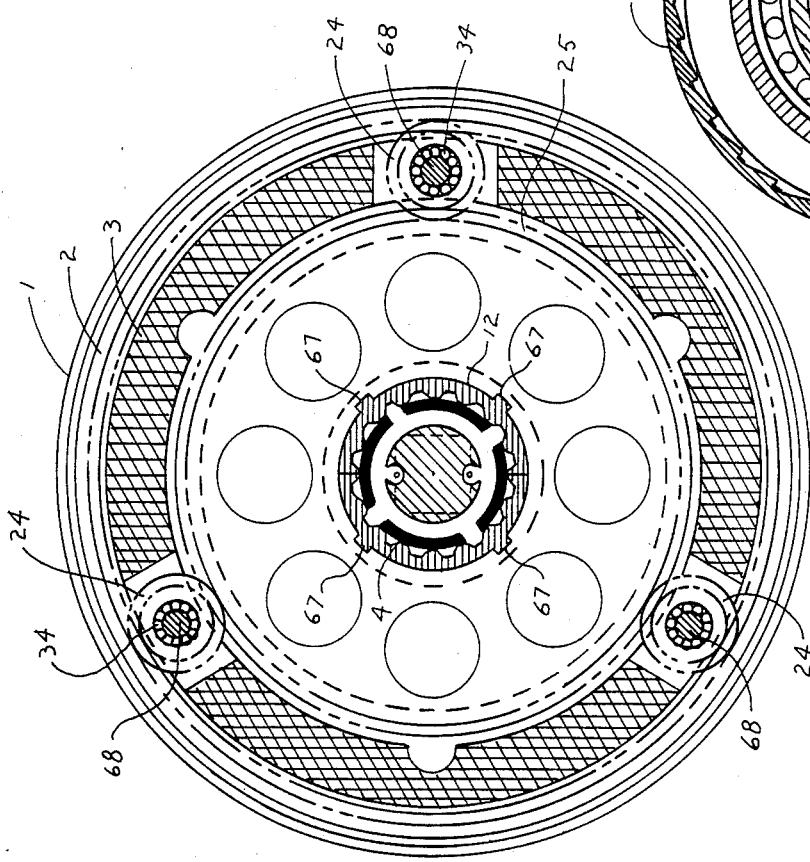
FIG. 7 is a cross sectional view taken along the line 7—7 of FIG. 3.

As seen in FIG. 3, a split ring 12 is installed in each of four circumferential grooves in the sun-gear-carrier 4. The split rings slide freely in the grooves. As seen in FIGS. 3 and 7, a sun gear 25 is installed over the split ring 12 in the first groove with four projections 67 keying it to the gear. As seen in FIG. 3 and in FIGS. 8, 9 and 10, sun gears 27, 29 and 31 are installed over the split rings in the next three grooves. The axial position of the sun gears is maintained by a shoulder on the left side of the sun gear 25, spacer sleeves 13 between the gears, and a washer and snap ring on the right side of sun gear 31.

As seen in FIG. 3, the planet-gear-carrier 3 is mounted on a square cross section on the pedal drive shaft 7. The right side pedal crank arm 9, which is attached to the drive shaft with the flush head screw 69, keeps the carrier fitting 3 firmly seated against a shoulder on the drive shaft 7. The ring gear 2 is mounted on a bearing 14 on the carrier fitting 3. Each of the front fork interface fittings 10 is mounted on a bearing 14 on the left and right side pedal crank arms 8 and 9, respectively. The sun-gear-carrier 4 is mounted on a bearing 14 on a sleeve 71 on the pedal drive shaft 7. The axial position of the bearings is maintained by shoulders on the crank arm 8 and sleeve 71, and by a spacer 70 on the left side. Shoulders on the carrier fitting 3 and pedal crank arm 9, together with the spacer sleeve 70, maintain the axial position of the bearings on the right side.

As seen in FIGS. 3 and 7, each of the three planet gears 24 is installed in the planet-gear-carrier 3 with small rollers 34 and a steel pin 68. Small integral shoulders on the gear 24 maintain the axial position of the rollers 34 in the gear, and thin sleeves installed between the ends of the rollers 34 and the walls of the carrier 3 maintain the axial position of the rollers 34 on the pin 68. The three planet gears 24 are in constant mesh with the ring gear 2 and the sun gear 25.

Figure 10:
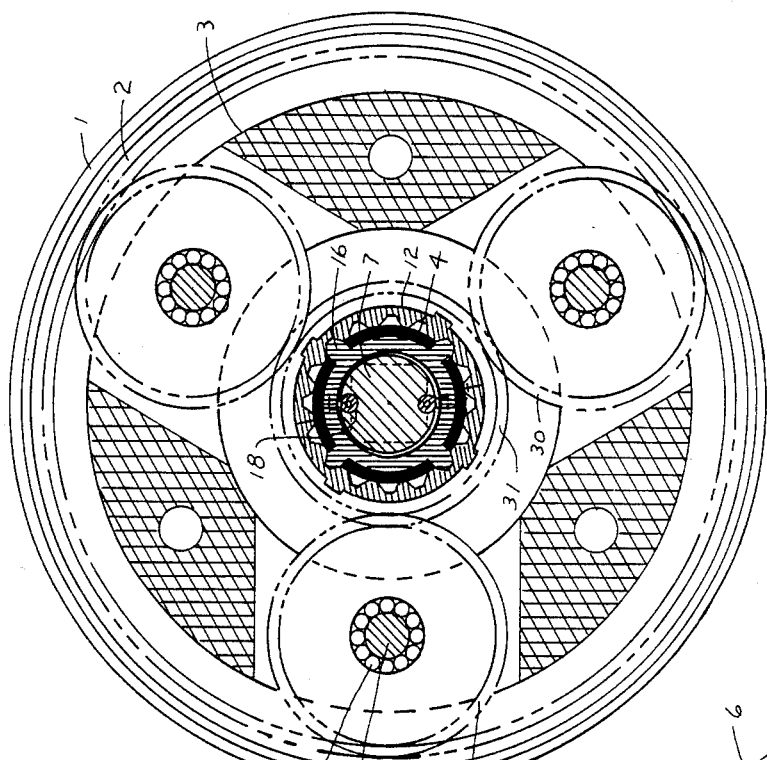
FIG. 10 is a longitudinal cross sectional view taken along the line 10—10 of FIG. 3
Figure 9:
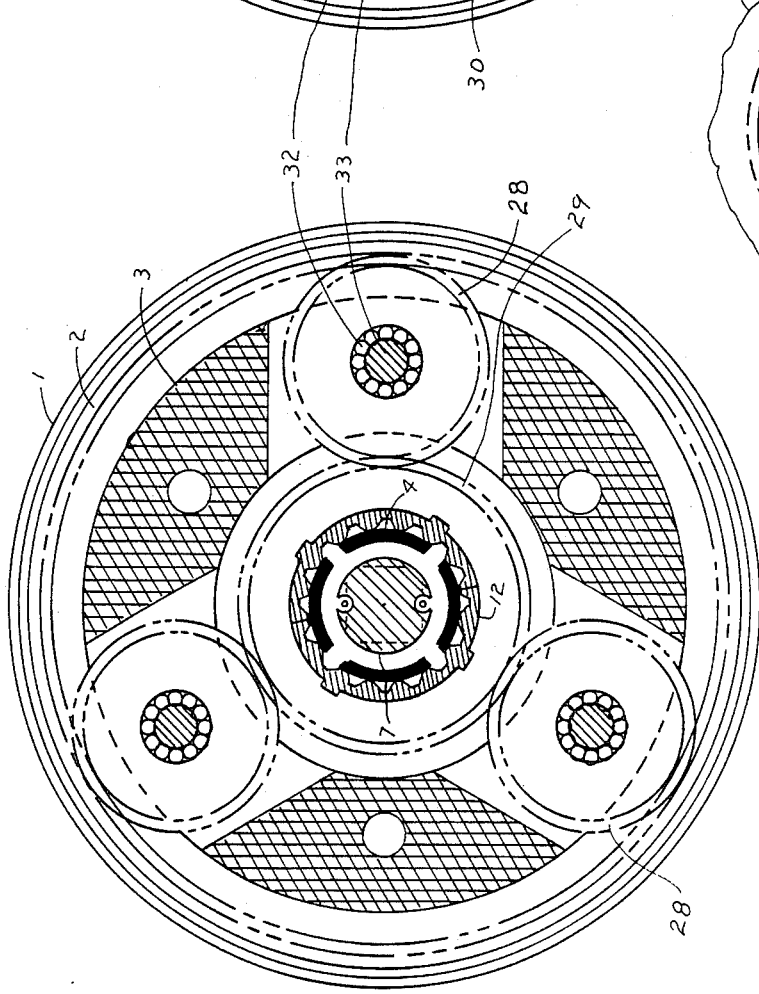
FIG. 9 is a cross sectional view taken along the line 9—9 of FIG. 3.

As seen in FIGS. 8, 9 and 10, each of the three planet gears 26, 28 and 30 is installed in the planet-gear-carrier 3 with rollers 32 and steel pin 33. Integral shoulders on the gears maintain the axial position of the rollers in the gears, and thin sleeves between the ends of the rollers 32 and the walls of the carrier 3 maintain the axial position of the rollers 32 on the pins 33. The axial positions of the pins 68 and 33 is fixed in the planet-gear-carrier 3 by the spring pins 72, as seen in FIG. 3. The planet gears 26, 28 and 30 are in constant mesh with the ring gear 2 and with the sun gears 27, 29 and 31, respectively.

As seen in FIGS. 3 and 10, the gear selector 16 is installed in the annular space between the sun-gear-carrier 4 and the pedal drive shaft 7. Four projections on the selector 16 extend radially outwardly in axial tracks in the sun-gear-carrier 4. A tooth form on the end of the projection matches an internal tooth form on the split rings 12. The gear selector thus transfers torque from the sun gear in the plane of which it is located, to the sun-gear-carrier 4, while the other three sun gears slide freely on the sun-gear-carrier. The depth of the axial tracks in the carrier 4 is preferably limited to $\frac{2}{3}$ the thickness of the carrier so that they do not impair its torsional integrity.

Figure 10A:
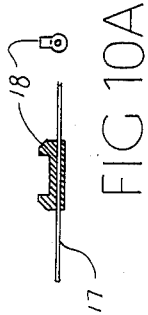
FIG. 10A is a longitudinal cross sectional view and an end elevational view of a swaged cable fitting.
Figure 11:
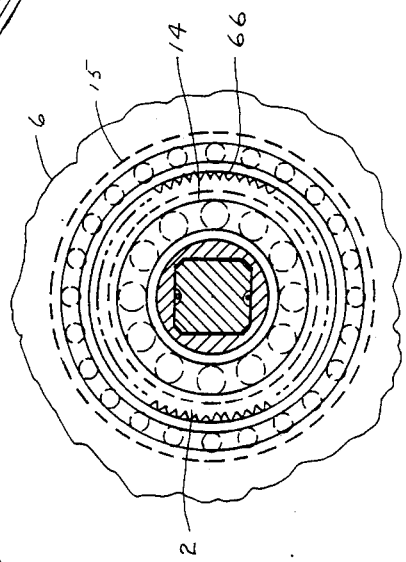
FIG. 11 is a view taken along the line 11—11 of FIG. 3; it is identical to a view taken along the line 11A—11A of FIG. 3 except that the cross section of the drive shaft along the line 11A—11A would be circular rather than square.

As seen in FIGS. 3, 10 and 10A, the axial position of the gear selector 16 is controlled by the selector actuation cable 17 and the swaged cable fitting 18. The pair of cables 17 and swaged fittings 18 slide in diametrically opposed grooves in the pedal drive shaft 7. The selector ring 16 slides freely between the shoulders on the swaged fitting 18 to accommodate the differential angular rate between the pedal drive shaft 7 and the sun-gear-carrier 4. The ends of the pair of cables 17 are clamped by the set screws 73 in the cable bar 19 in the right side pedal crank arm 9, and in a similar bar in the left side crank arm 8. A compression spring 23 in the left crank arm 8 maintains tension in the cables. The spring force is resisted by the pendulum 20 which is joined to the cable bar 19 by the pin 74 and the positioning pin 21. As seen in FIG. 4, the positioning pin 21 can be located in any one of the four retaining notches in the crank arm 9, which correspond to the locations for the gear selector 16 in the planes of the four sun gears. An access plate 22 in each crank arm permits initial assembly and subsequent servicing if required.

The outboard ends of integral cylindrical extensions on both the ring gear 2 and the sun-gear-carrier 4 have an external tooth form 66 which is used for locking them against rotation.

Referring to FIG. 1 and to the enlarged views shown in FIGS. 14 and 15, the front fork 35 has a vertical slot on the right side through which a positioning pin engagement block 50 protrudes. The engagement block 50 is connected to a shift lever 52 by a connecting rod 51. With the right side crank arm 9 aligned with the slot, lifting up on the shift lever 52 pulls the block 50 into engagement with the positioning pin 21, lifting it off its retaining notch. The pendulum 20 mounting the positioning pin 21 permits a slight rocking of the crank arm 9, with the positioning pin 21 captive in the block 50. By raising and lowering the shift lever, coupled with a slight rocking of the crank arm, the positioning pin can be located in any one of the four retaining notches. When the shift lever 52 is released, the block 50 drops to the bottom of the slot where it clears the lowest position for the positioning pin 21.

Referring again to FIGS. 1, 14 and 15, a gear lock lever 53 is connected rigidly to a torque tube 75 with short crank arms 76 on its opposite ends. The right side crank 76 actuates a ring gear locking rod 54, and the left side crank actuates a rod 55 for locking the sun-gear-carrier 4. The lower ends of the locking rods 54 and 55 terminate in gear locking blocks 61, as seen in FIGS. 14 and 15, which have a tooth form matching that on the exposed cylindrical extensions on the ring gear 2 and sun-gear-carrier 4. The blocks 61 slide in the tracks 62 rigidly fixed to the front fork 35. With the locking lever 53 in the centered position, both the ring gear and the sun-gear-carrier are free to rotate. with the lever 53 in the forward position, the sun-gear-carrier 4 is prevented from rotating, and with the lever 53 in the aft position, the ring gear is prevented from rotating.

When the sun-gear-carrier 4 is prevented from rotating by the left side locking block 61, the transmission gear ratio is given by the equation $(N+n)/(0.5N+n)$, where N is the number of teeth in the sun gear in the plane of which the gear selector 16 is located, and n is the number of teeth in each of the three mating planet gears, which drive the ring gear 2. When the ring gear 2 is prevented from rotating by the locking block 61 on the right side, the transmission gear ratio is given by the equation $(N+n)/0.5N$, where N and n are as defined above and the planet gears mating with the locked sun gear drive the sun-gear-carrier at a multiplied rate of speed.

In the example design selected to illustrate the planetary transmission in accordance with the present invention, 32 pitch gears are used with 144 teeth and a resultant pitch diameter of 4.5 inches for the ring gear 2. The number of teeth in each sun gear and in its mating planet gears is given in the table below with the resulting gear ratios. In first speed, both the ring gear and the sun-gear-carrier are free to rotate. In speeds two through five the sun-gear-carrier is prevented from rotating, and in speeds six through nine the ring gear is prevented from rotating.

| Speed | N | n | ratio |
| --- | --- | --- | --- |
| first | | | direct drive |
| second | 48 | 48 | 1.333 |
| third | 60 | 42 | 1.417 |
| fourth | 84 | 30 | 1.583 |
| fifth | 108 | 18 | 1.750 |
| sixth | 108 | 18 | 2.333 |
| seventh | 84 | 30 | 2.714 |
| eighth | 60 | 42 | 3.400 |
| ninth | 48 | 48 | 4.000 |

The gears and resulting gear ratios listed above are presented for illustrative purposes and the present invention should not be considered as limited to them.

As shown in FIG. 1, the transmission 64 according to one embodiment of the present invention is installed in the front wheel 63 of a bicycle camper. The camper includes a molded shell 56 of fiberglas/epoxy or similar composite, with provisions for mounting a rear wheel 65 in a wheel well in the shell.

Figure 12:
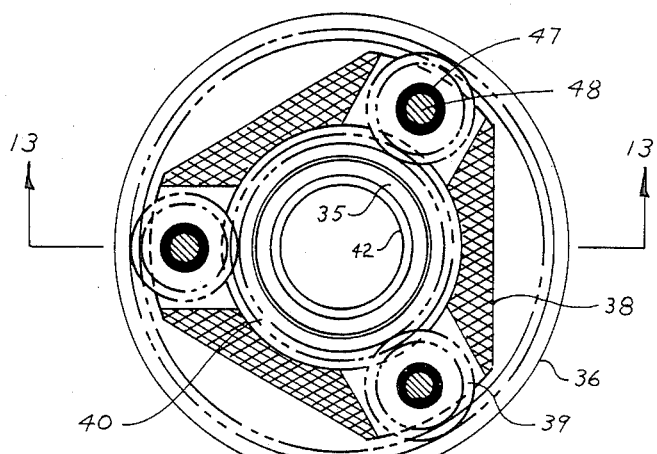
FIG. 12 is a cross sectional view taken along the line 12—12 of FIG. 1.
Figure 13:
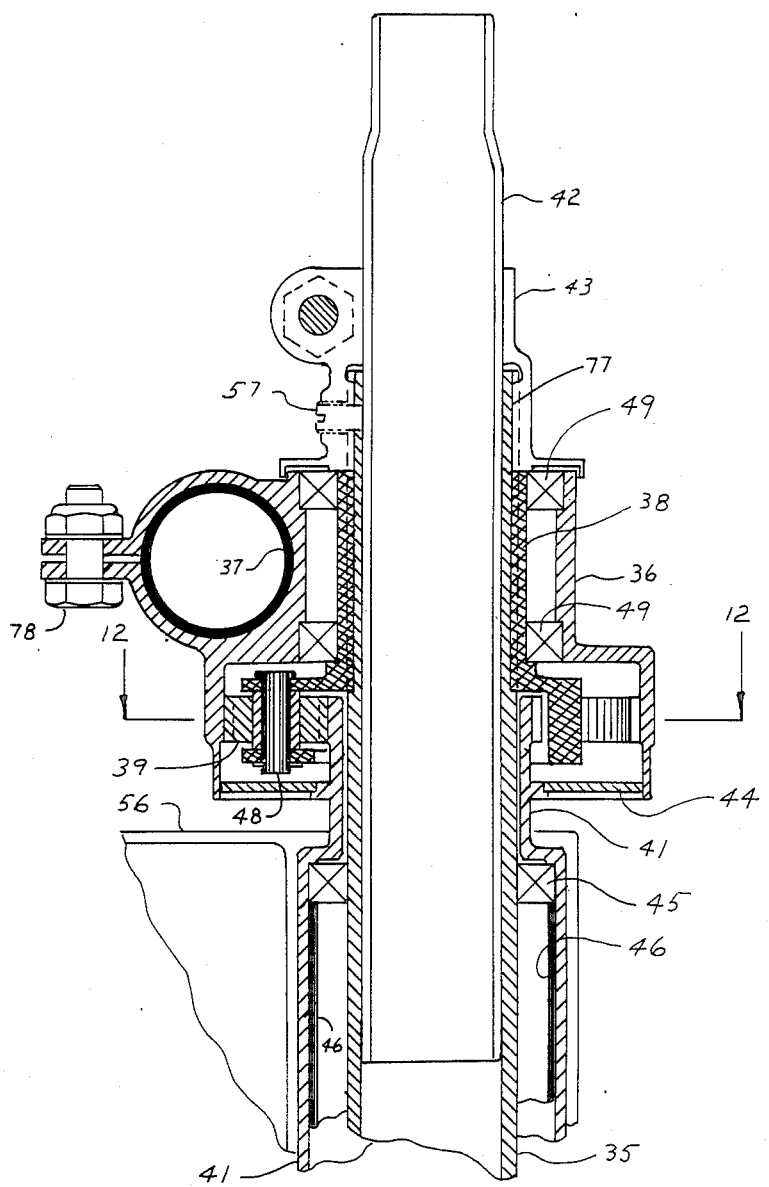
FIG. 13 is a cross sectional view taken along the line 13—13 of FIG. 12.

Referring to FIGS. 12 and 13, a steel head tube 41 is bonded in the forward end of the molded shell 56. The front fork 35 is held centered in the head tube by the upper bearing 45 and a lower bearing at the bottom end of the head tube 41. The position of these bearings is maintained by the spacer 46, and by a snap ring below the lower bearing which holds them captive in the head tube 41.

A sun gear 40 of a planetary steering arrangement is rigidly fixed at the top end of the head tube 41. A planet-gear-carrier 38 fits down over a spline 77 at the upper end of the front fork 35 and is seated on a shoulder on the front fork. A ring gear 36 is mounted on a pair of bearings 49 on the carrier 38. Three planet gears 39 are rotatably mounted on the planet gear carrier 38 and are in mesh with the ring gear 36 and the sun gear 40. The handlebars 37 are clamped to the ring gear 36 with the bolt 78. A seat post clamp 43 also engages the spline 77 of the front fork 35 and is seated on the upper end of the planet gear carrier 38 where it is locked in place by the set screw 57. Oil-filled porous bronze bushing 47 are pressed into the planet gears 39 and rotate on the polished steel pins 48 in the carrier 38. The outside diameter of the seat post 42 is a close fit inside the tubular upper portion of the front fork 35 and is clamped in placed with the seat post clamp 43.

In the example design prepared to illustrate the steering portion of the bicycle camper, 32 pitch gears are used with 45 teeth for the sun gear, 21 teeth for each planet gear, and 87 teeth for the ring gear. With these gears, 1.5 degrees of handle bar rotation relative to the fixed sun gear results in one degree of front fork rotation. Since the seat rotates with the front fork, ½ degree of handlebar rotation relative to the seat results in one degree of front fork rotation, and the rider's position relative to the pedals is unchanged during turns.

While this invention has been described in terms of a few preferred embodiments, it is anticipated that persons reading the preceding descriptions and studying the drawings will realize many possible modifications thereof. For example, two or four planet gears could be used on the carrier fitting instead of three, and many alternate gear ratios are, of course, possible Likewise, the addition of a sun gear and mating set of planet gears would result in an eleven speed transmission, while the removal of a set would result in a seven speed transmission.

It is therefore intended that the following appended claims be interpreted as including all such modifications and alternations as fall with the true scope and spirit of the present invention.

I claim:

1. In a pedal powered vehicle including a frame, a driving wheel with a central hub, a pedal drive shaft on the axis of said wheel and mounted in bearings for concentric rotation with said hub, an improved multiple speed planetary transmission located within said hub for concentric rotation therewith and comprising:
   a planet-gear-carrier axially fixed on said pedal drive shaft for rotation therewith;
   multiple sets of different size planet gears rotatably mounted on said planet-gear-carrier;
   an internally toothed ring gear in constant mesh with all of said multiple sets of planet gears and mounted for rotation about said pedal drive shaft;
   external ring gear locking means operative for selectively locking said ring gear to said frame;
   a sun-gear-carrier rotatably mounted in a fixed axial position on said pedal drive shaft;
   external sun gear carrier locking means operative for selectively locking said sun-gear-carrier to said frame;
   multiple externally toothed sun gears meshed with said multiple sets of planet gears, respectively, rotatably mounted on said sun-gear-carrier;
   key means operative for selectively locking any one of said multiple sun gears to said sun-gear-carrier;
   first free-wheel ratchet means coupled between said hub and said ring gear for driving said hub;
   second free-wheel ratchet means coupled between said hub and said sun-gear-carrier for driving said hub; and gear ratio selection means for operating one of said ring gear locking means and said sun-gear-carrier locking means.

2. A transmission according to claim 1 wherein closing plates of said hub mount the pawl portions of said first ratchet means and said second ratchet means are coupled to and support opposite ends of said wheel hub.

3. A transmission according to claim 1 wherein said transmission includes left and right pedal crank arms for rotating said pedal drive shaft, said left and right crank arms including integral cylindrical extensions defining seats, respectively; and including a pair of ball bearings carried by said seats, and further including a pair of frame interface fittings carried by said pair of ball bearings, respectively, said frame interface fittings being adapted to receive and, support a portion of said frame.

4. A transmission according to claim 1 wherein said pedal drive shaft includes groove means; said key means includes cable means; said sun-gear-carrier including a plurality of circumferential grooves; a plurality of split rings installed in said circumferential grooves, respectively; said multiple sun gears receiving said split rings; external teeth on said split rings keying said split rings to said sun gears, respectively, for rotation therewith; a gear selector keyed to said sun-gear-carrier for rotation therewith; internal teeth on said split rings keying said split rings to said gear selector; axial grooves in said sun-gear-carrier permitting axial movement of said gear selector relative to said split rings for engaging one of said split rings and locking the associated one of said sun gears to said sun-gear-carrier; and wherein said gear selector is freely rotatable within said cable means and said cable means is operative to control the axial position of said gear selector.

5. A transmission according to claim 4 and wherein said cable means includes a fitting receiving said gear selector and axially slidable in said groove means in said pedal drive shaft; and including bar means slidably carried in one of said pedal crank arms, respectively; a pendulum pivotally carried by said bar means and having a positioning pin extending from said one of said pedal crank arms; said one of said pedal crank arms including a plurality of radially spaced retaining notches for receiving said positioning pin; positioning means for moving said positioning pin in a first direction to a selected one of said notches; and bias means tending to urge said positioning pin in a direction opposite said first direction.

6. A transmission according to claim 1 wherein said vehicle is a front wheel drive bicycle having a front fork and a rider's seat on the axis of and rotating with said front fork; an elongated molded camper shell having a steel tube bonded in the forward end of said molded shell; a steering sun gear fixed on the upper end of said steel tube; a pair of ball bearings captive in said steel tube and engaged upon and centering said front fork; a steering planet-gear-carrier torsionally fixed on said front fork above said steering sun gear and including multiple steering planet gears rotatably mounted on said steering planet-gear-carrier in mesh with said steering sun gear; an internally toothed steering ring gear rotatably mounted on said steering planet-gear-carrier in meshing relation with said steering planet gears; handlebars fixed to said steering ring gear for rotation therewith; and wherein said transmission is coupled to said front wheel for driving said front wheel.

7. A transmission according to claim 6 including a first ball bearing seated on said planet gear carrier and wherein said cylindrical extension of said ring gear is rotatably supported by said first ball bearing; and further including a second ball bearing seated on said pedal drive shaft, and wherein said cylindrical extension of said sun-gear-carrier is rotatably supported by said second ball bearing; and further including a first wheel bearing seated on said cylindrical extension of said ring gear, and wherein said first ratchet means is rotatably supported by said first wheel bearing; and further including a second wheel bearing seat on said cylindrical-extension of said sun-gear-carrier, and wherein said second ratchet means is rotatably supported by said second wheel bearing.

* * * * *